Aug. 8, 1933.   S. W. SPARKS   1,921,589
METHOD OF MAKING ROLLED STEEL VALVE BODIES
Filed March 10, 1928   5 Sheets-Sheet 1
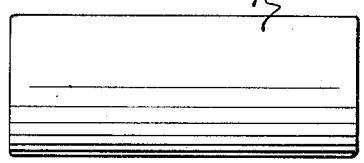
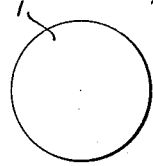
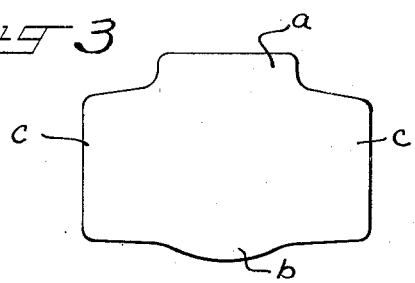
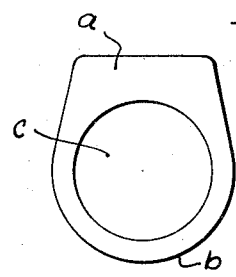
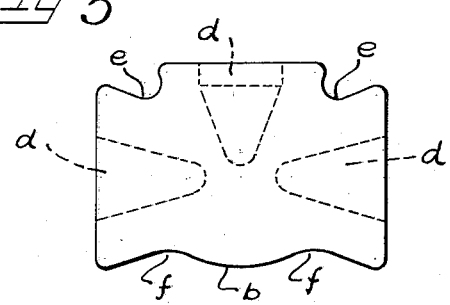
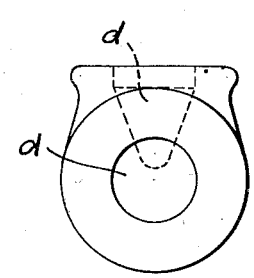
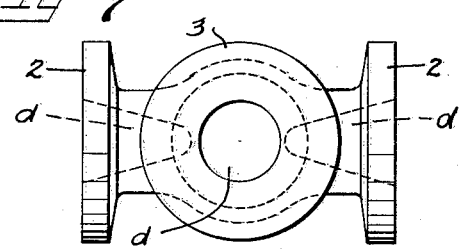
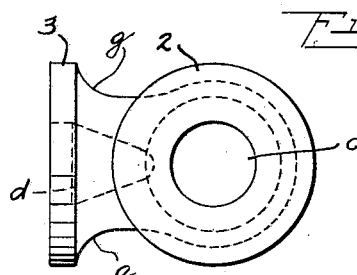
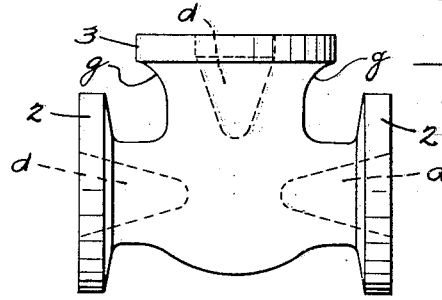
INVENTOR:
Stanley W. Sparks,
BY
His ATTORNEY,
W. Swenarton Aug. 8, 1933. S. W. SPARKS 1,921,589
METHOD OF MAKING ROLLED STEEL VALVE BODIES
Filed March 10, 1928 5 Sheets-Sheet 2
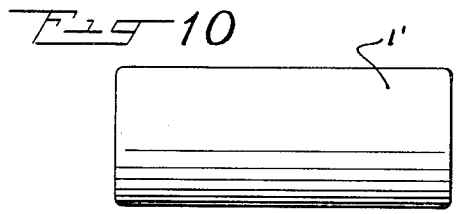
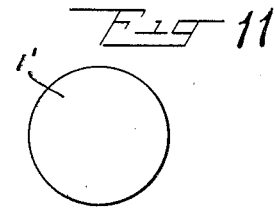
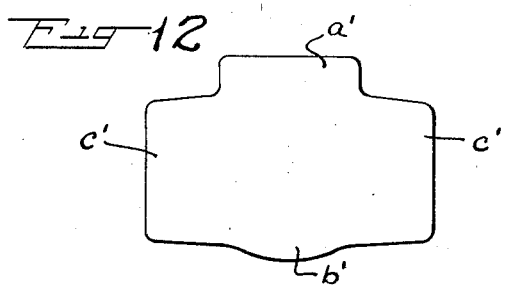
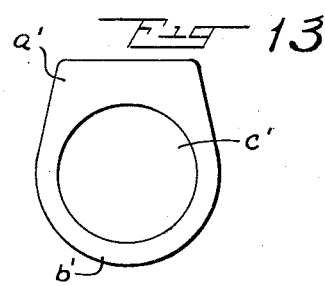
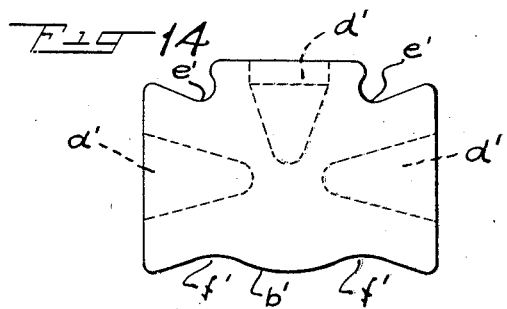
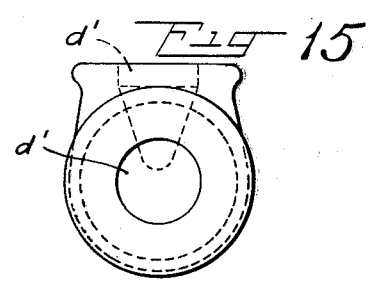
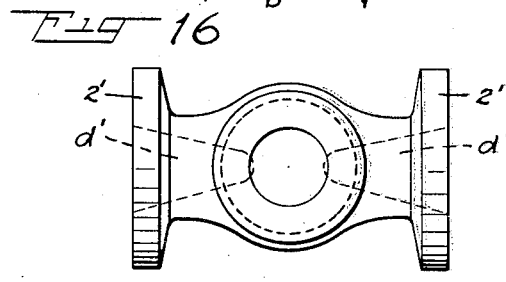
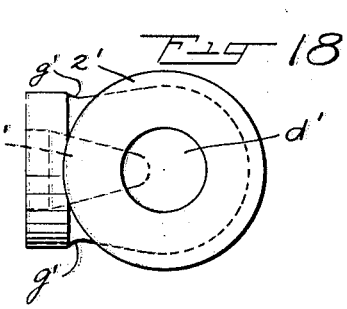
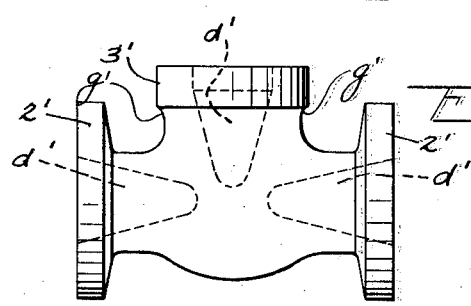
INVENTOR:
Stanley W. Sparks,
BY
His ATTORNEY.

Aug. 8, 1933.  S. W. SPARKS  1,921,589
METHOD OF MAKING ROLLED STEEL VALVE BODIES
Filed March 10, 1928  5 Sheets-Sheet 3
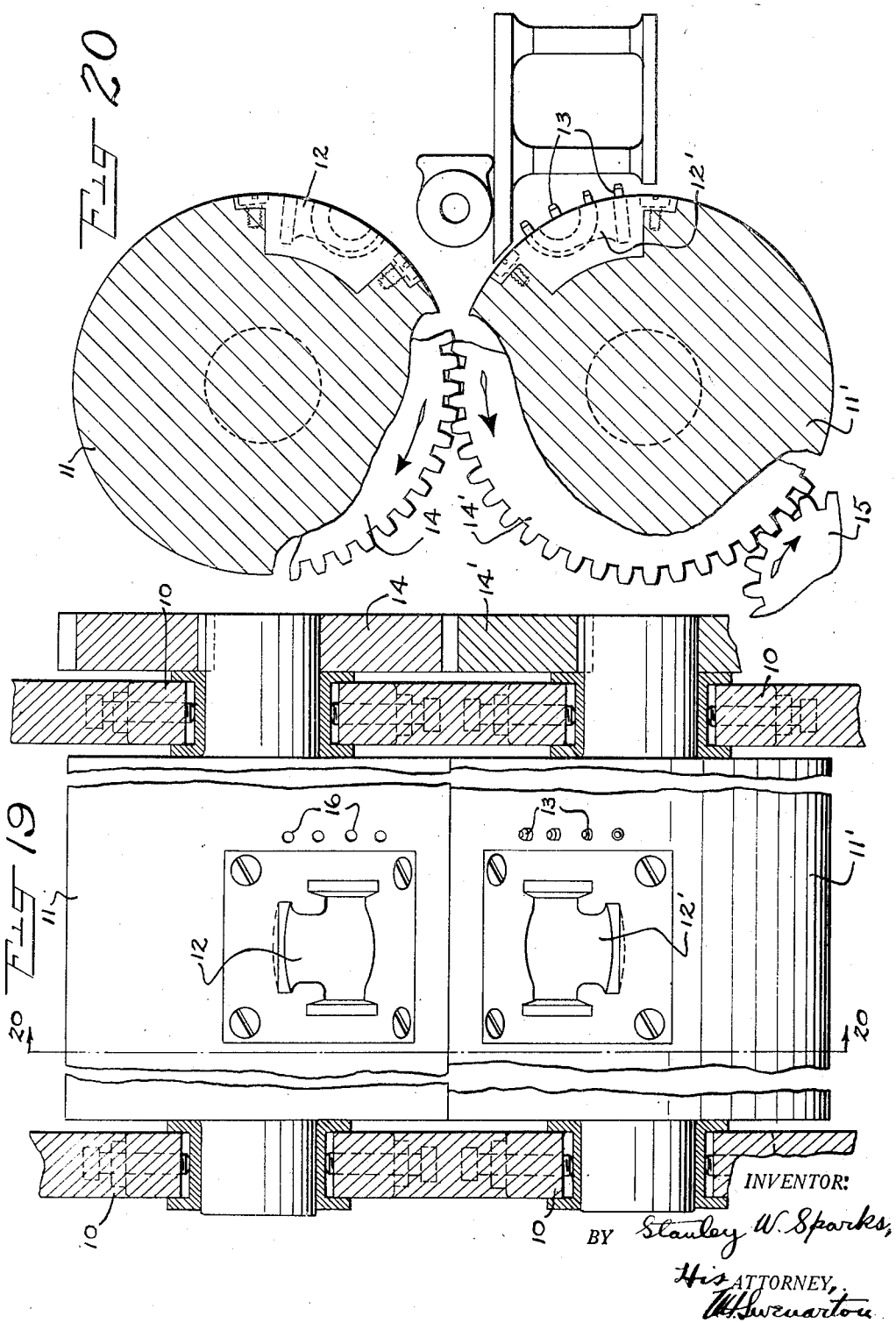

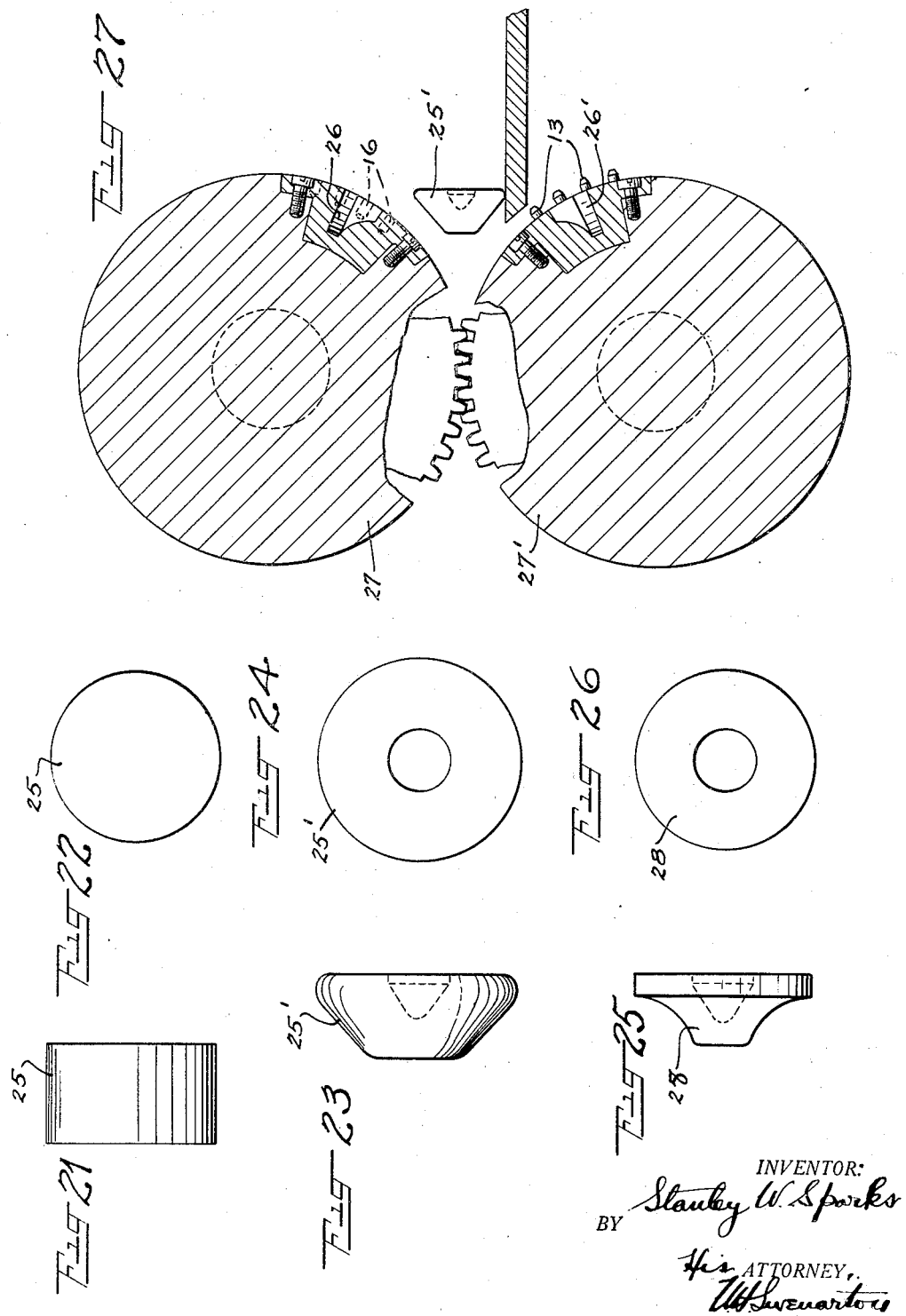

Aug. 8, 1933.  S. W. SPARKS  1,921,589
METHOD OF MAKING ROLLED STEEL VALVE BODIES
Filed March 10, 1928  5 Sheets-Sheet 5
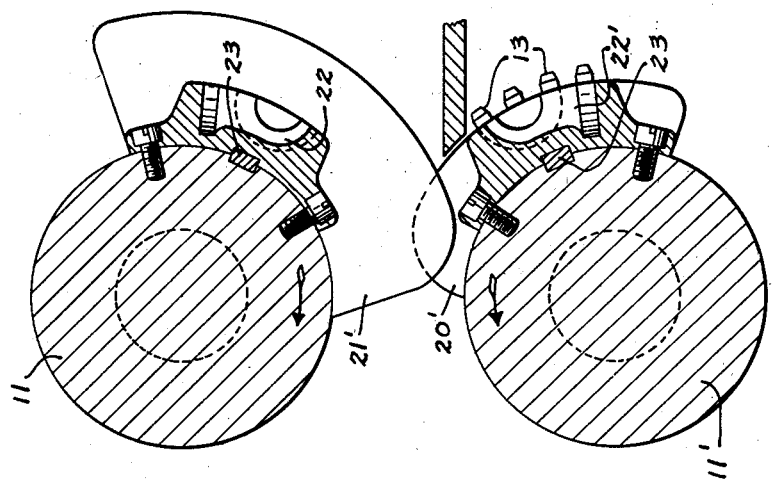
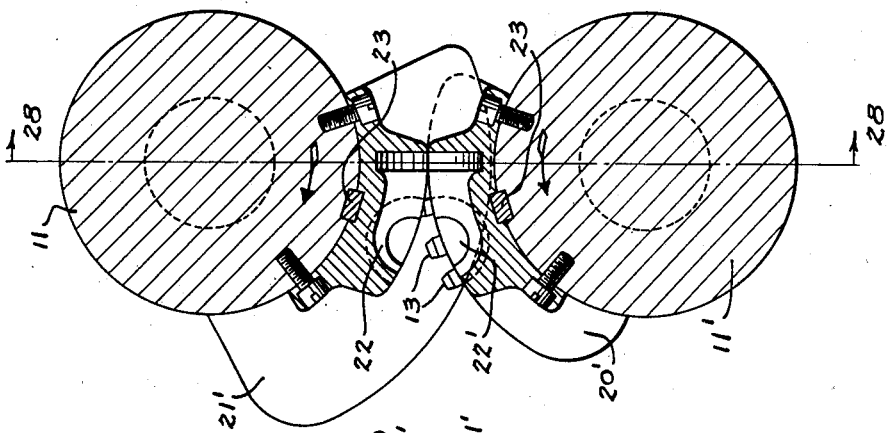
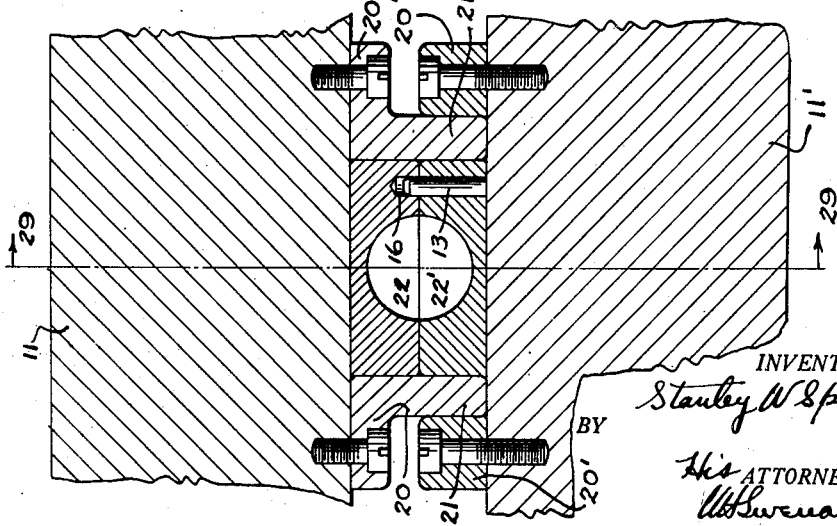
INVENTOR:
Stanley W Sparks,
BY
His ATTORNEY, Patented Aug. 8, 1933

1,921,589

UNITED STATES PATENT OFFICE 1,921,589

METHOD OF MAKING ROLLED STEEL VALVE BODIES

Stanley W. Sparks, New York, N. Y., assignor to C. H. Bickell, trustee

Application March 10, 1928. Serial No. 260,577

3 Claims. (Cl. 29—157.1)

This invention relates to the production of valve bodies and more particularly valve bodies suitable for the requirements of refinery, power plant, pumping plant, chemical works, water lines, oil well, drilling, pipe lines and general oil country services to replace cast and forged steel gate and globe valves and cocks such as now used.

The objects of my invention are the provision of a valve structure which is capable of wide application, being suitable for high, intermediate and low pressure service, is readily adapted to standardization with slight structural changes to adapt the same for valves of different classes and also for the manufacture of such a valve in mass production at an extremely low price from rough forged, rolled or work metal billets. Other advantages of my improved method and valve structure are hereinafter set forth.

It is customary at the present time in the manufacture of drop-hammered or hydraulic forgings to subject the same to one or more successive blows of a drop-hammer or in the case of an hydraulic forging, to one or more of successive thrusts of a plunger. As a consequence, it is necessary to subject the forgings to excessive mechanical or hydraulic pressures in order to obtain the desired forgings of the shape desired.

My investigations have led to the discovery that by applying pressure progressively to the forging under treatment in accordance with a leverage principle, by subjecting the same to a rolling operation, not only is it possible to greatly increase the rate of mass production of the valve bodies, but the amount of pressure required for the production of a body of a given size is very much less than that required in ordinary drop or hydraulic forging operations, besides many other advantages, as hereinafter specified, being obtained.

In the accompanying drawings in which I have illustrated a preferred embodiment of my invention and of the method of forming my improved valve body.

Figure 1 is a longitudinal elevation of a billet; and Fig. 2 is an end elevation of a rough billet used in the manufacture of a desired valve body;

Fig. 3 is a longitudinal elevation and Fig. 4 is an end elevation of the same billet after the first rough forging operation;

Fig. 5 is a longitudinal elevation and Fig. 6 is an end elevation of the rough forged billet after the second drop-hammer forging operation;

Fig. 7 is a plan view and Fig. 8 is a longitudinal elevation and Fig. 9 is an end elevation of the rough finished rolled valve body prior to boring the valve chamber and fluid ways therein;

Figs. 10 to 18 inclusive are corresponding views showing the steps in the manufacture of a valve body of modified construction;

Fig. 19 is a vertical front elevation partly in section of a pair of rolls carrying dies suitable for the production of a valve body, such as shown in Figs. 7 to 9 inclusive;

Fig. 20 is a transverse vertical section along the line 20—20 of Fig. 19 with the rough forged billet and rolling table being shown in elevation;

Figs. 21 and 22 are longitudinal elevation and end elevations of the rough billet used for forming the valve bonnet member;

Figs. 23 and 24 are similar views of such billet after the first rough forging operation;

Figs. 25 and 26 are similar views of the rough finished rolled valve bonnet prior to the chamber being bored therein;

Fig. 27 is a vertical section partially broken away of the bonnet forming rolls, the billet being shown in elevation;

Fig. 28 is a vertical longitudinal section on line 28—28 of Fig. 29 of a pair of rolls having co-operating die-carrying pad members applied thereto;

Fig. 29 is a transverse section along the line 29—29 of Fig. 28 showing the position of the rolls immediately before the finish of the rolling operation and Fig. 30 is a view corresponding to Fig. 29 showing the position of the rolls immediately prior to a billet being fed thereto.

Referring to the drawings and the construction shown therein, the reference numerals 1, 1' designate the respective rough billets employed for producing the two different types of valves shown in Figs. 1 to 9 and 10 to 18 inclusive respectively, prior to the preliminary shaping of such billet to adapt the same for entering the dies. The first rough forging operation compresses the billet to form a top boss $a$ or $a'$ and an upset bottom portion $b$ or $b'$ and reduced ends $c$ or $c'$ on the billets used in the two types of valves as aforesaid. The second preliminary shaping thereof, in which operation drifts are employed in order to form the conical recesses $d$ or $d'$, still further compresses the billet so as to form flares at the ends into rough hubs and form shoulders $e$ or $e'$ and $f$ or $f'$ respectively between the body and such rough hubs thereof. Following the rolling operation, the rough finished valve body shown in Figs. 7, 8 and 9 16, 17 and 18 will have integral hub members 2 or 2' and top flanges 3 or 3' which are adapted to receive the bonnet and the body thereof will have three conical recesses $d$ or $d'$ depending on the type of valve produced.

In the construction shown in Figs. 19 and 20, the reference numeral 10 designates a housing in which are mounted standard rolls 11, 11' in the customary manner. Each of these rolls carries a die, the opposing dies 12, 12' respectively having die cavities corresponding to one half of the valve body to be formed therein. Said dies are either counter-sunk into recesses as shown in Figs. 19 and 20, so that no portions thereof, other than the centering pins 13, project beyond the periphery of the rolls, or the dies may be formed in pads adapted to be externally secured on the periphery of the rolls as hereinafter described with reference to the construction shown in Figs. 28 to 30 inclusive. The rolls are provided with intermeshing spur gears 14, 14' which are synchronously driven by a pinion 15 in the manner customary in rolling mills or the rolls may be driven in exact synchronism in any other desired manner and a series of centering means, as teeth or pins 13 which are so positioned as to register with a corresponding series of holes 16, serve to prevent any possible back lash or relative lateral shift of the rolls occurring at the moment the billets are fed into the dies or during the entire rolling operation.

In the constructions shown in Figs. 28 to 30, the die-carrying pads 20, 20' are screwed or bolted to the periphery of the rolls, and as shown, pad 20 has vertical spacing flanges or guides 21, 21' immediately adjacent the dies 22, and these serve to properly space and support the rolls during the rolling operation. Keys 23 are preferably employed to more securely hold the pads in exact alinement with each other or if desired, dowel pins may be employed for such purpose.

In Figs. 21 to 26 inclusive, the rough metal billet 25 is first rough forged to a shape as illustrated in Figs. 23 and 24 and then the same is entered into the dies 26, 26' carried by the revolving rolls 27, 27' and the rough bonnet member formed by the rolling operation in said dies is subsequently machined to conform to the body member to which it is applied.

In carrying out my improved method it is desirable that the size of the rough metal billet should correspond in its cubical content to that of the finished forging delivered by the roll and preferably the length of the billet is also slightly shorter than the inside length of the dies as this permits of the rough billet being easily entered into the revolving dies.

In the pre-forming operations on the billet, the same is first heated to a proper rough forging temperature, preferably from about 1500° F. to 1800° F. and then the top and bottom is swedged under a power hammer or press to form the rough hubs and rough top flange such as illustrated in Figs. 5, 6, 14 and 15 or in the case of the bonnet, the bonnet billet is swedged to the shape shown in Fig. 23. During the swedging operation three pointed steel mandrels or drifts are driven into the body to form the recess $d$ aforesaid, or in the case of the bonnet, a single drift is employed to form the conical recess $f$. These apertures or recesses facilitate the more uniform and thorough penetration of the heat throughout the billet during the subsequent heating of the billet to prepare the same for the rolling operation and simplify the subsequent machining of the body to form the fluid ways and valve chamber therein.

The prepared billet, after the drifts have been removed, is again heated immediately prior to the roll forming operation to a temperature somewhat above the aforesaid forging temperature but below the usual extrusion temperatures which range from about 2200° F. to 2400° F. and preferably to about 2100° F. and then the drifts are replaced in the conical recesses or recess and the billet while still in a semi-plastic or kneadable state is entered into the dies carried by the rotating rolls.

The rolling operation not only greatly reduces the amount of pressure required to form the valve body as compared with the pressure required in extrusion and ordinary forging operations, this being due to the progressive step-by-step application of pressure along the line of contact of the two rolls or of the pads secured thereto, but also this rolling operation greatly improves the physical characteristics of the metal, since through the rolling of the metal while in a semi-plastic or kneadable state, a virtual puddling or kneading of the metal results whereby the molecular structure is modified and blow holes, air and gas pockets fracture lines and other defects common to cast or forged shapes are eliminated and a homogenous structure is obtained.

While I have illustrated the dies applied to rolls the same can be also applied to the opposing movable members of a toggle press, each of which members are mounted on opposed centers and adapted to rotate through an arc of the same radius.

Preferably as shown, in order to permit of the free recovery of the finished body from the rolls without deformation during the removal thereof, the inner faces $g$ or $g'$ of top flanges are produced on a curve to permit of the corresponding portion of the die freeing itself from the finished form as the latter is delivered.

In the rolling operation whether the same is conducted in a rolling mill or in a toggle press, the pressure upon the billet introduced into the dies will be applied progressively to a small section or area of the billet or rough valve body confined within the die, instead of being simultaneously applied over the whole surface of the billet as occurs in an extrusion operation or in a drop-hammer or hydraulic forging operation, with the consequence that but a small fraction of the pressure ordinarily required in producing bodies of various sizes is necessary. The aforesaid machining operation to establish the fluid ways in the valve chamber therein and to otherwise finish the ends of the flanges and body is similar to ordinary machining operations well known in this art.

The method of rolling shapes, such as the valve body herein described, differ radically from ordinary rolling operations, such for example as those employed in the rolling of rails for railways in that my process, in lieu of ordinary grooved rolls being employed to which the billet is presented transversely i. e. at right angles to the axes of the rolls, I employ dies which are distorted to the extent necessary so that through the rolling operation described herein the rough valve body produced will have one axis of a length corresponding to a dimension of either die measured on an arc of a circle and another axis of such body will be of a length corresponding to a dimension of the combined dies measured on a radial line, such as the section line shown in Fig. 29 for example, intersecting the centers of oscillation of the supports on which the dies are located. On the other hand, unlike the ordinary forging operations wherein a billet is subjected to the action of either a drop-hammer hydraulically actuated piston, the billet while being rolled in accordance with my improved method is not subjected to blows or concussion, but to only uniform pressure of the rolls progressively applied to small areas thereof. Furthermore, in carrying out my method, the opposing dies react on the billet inserted therein longitudinally, vertically and transversely during the progressive rolling of such billet.

Whenever either because of the large size of the valve body desired or because of the other difficulties encountered, it is not feasible to produce the rough valve body of the desired external dimensions by a single rolling operation either in a pair of rolls or in a toggle press, the rolled unfinished body may be re-run one or more times through the rolls or press until the same has assumed the ultimate combined shape of the dies.

Various modifications within the scope of the appended claims may be made both in the process and in the resultant article without departing from the spirit of my invention as embraced therein.

Having thus described my invention, what I claim and desire to obtain by United States Letters Patent is:

1. The method of rolling a valve body which comprises presenting a billet of the rough shape of the desired valve body, while heated to a semi-plastic condition and sufficiently to admit of rolling thereof, to a pair of dies mounted peripherally on cooperating and opposing arcuate surfaces of movable opposing supports, the respective arcuate surfaces of which are adapted to have rolling engagement with each other, the longitudinal axes of said dies being substantially parallel to the axes of rotation of said supports, causing the rotation of said dies while the same are in contact with each other and while said billet is confined within said dies, recovering the valve body obtained by such rolling operation from the dies and establishing a fluid way therethrough and a valve chamber therein by a machining operation.

2. The method of making a valve body which comprises rough shaping a billet, forming a plurality of cavities therein to admit of the penetration of heat into the interior of said billet, inserting into said cavities drifts of the exact configuration of said cavities to prevent the collapse of the billet during the rolling thereof, heating said rough shaped billet to a temperature above a forging temperature and sufficient to render the same semi-plastic and admit of the rolling thereof, introducing said billet into a plurality of dies arranged to move at substantially right angles to their longitudinal axes, causing said dies to intimately contact with each other under high pressure while at least one of said dies is moving in a curvilinear path and recovering the valve body so obtained from said dies.

3. In the method of making a valve body, the steps which comprise preforming a billet to form a rough body having opposing rough hub portions, centrally prepiercing the hubs and top of the body to admit of the ready penetration of heat thereinto, heating the rough body so prepierced above a rolling temperature and sufficiently high to render the same semi-plastic while the cavities thereof are empty, completely filling the cavities with a drift and subjecting the body while still heated to a semi-plastic condition to a rolling operation by presenting the same laterally to the pressure of a pair of identic opposing dies while each of them are travelling in the arc of a circle of the same radius.

STANLEY W. SPARKS.